United States Patent

McLean et al.

[11] 3,922,205
[45] Nov. 25, 1975

[54] PORTABLE POLAROGRAPHIC ANALYZER AND QUICK POLAROGRAPHIC DETERMINATIONS

[75] Inventors: James D. McLean, Midland; John F. Holland, Lansing, both of Mich.

[73] Assignee: The Dow Chemical Company, Midland, Mich.

[22] Filed: Oct. 1, 1974

[21] Appl. No.: 510,964

Related U.S. Application Data

[63] Continuation-in-part of Ser. No. 389,821, Aug. 20, 1973, abandoned, which is a continuation-in-part of Ser. No. 250,167, May 4, 1972, abandoned.

[52] U.S. Cl. ......... 204/1 T; 204/195 R; 204/195 H
[51] Int. Cl.² ..................................... G01N 27/48
[58] Field of Search ............ 204/1 T, 195 H, 195 R, 204/195 P

[56] References Cited
UNITED STATES PATENTS
2,889,518  6/1959  Hudson et al. ............... 324/99 D X

OTHER PUBLICATIONS

I. M. Kolthoff et al., "Polarography," p. 362, Vol. 1, (1952).
John M. Lupton et al., J. American Chem. Soc., pp. 697–700, May 1944.
A. Borello et al., J. Electroanalytical Chem. and Interfacial Electrochem., Vol. 30, No. 2, pp. 231–235 (1971).
Otto H. Muller, "The Polarographic Method of Analysis," pp. 1,2,25–30 & 39, (1951).
G. W. C. Milner, "The Principles and Applications of Polarography," pp. 22 & 23, (1957).
Applications Manuel for Operational Amplifiers, pp. 79 & 87, Philbrick/Nexus Research, Aug. 1969.
P. Zuman et al., "Progress in Polarography," pp. 373 & 384, Vol. II, (1962).

*Primary Examiner*—G. L. Kaplan
*Attorney, Agent, or Firm*—Edward E. Schilling

[57] ABSTRACT

A special purpose portable polarographic instrument and method for the rapid repetitive quantitative determination of polarographically reactive species in aqueous solution utilizing a sample cell in which are placed a conducting sample solution, a suitable reference electrode and a fixed area working electrode and, connected to the electrodes, a special circuit for (1) impressing across the cell a reducing or oxidizing voltage throughout a time linear pre-selected range of scanning potential, (2) proportionately converting the consequent current flow to a potential, and (3) measuring the potential. The maximum potential is retained in a peak seeking voltage circuit and is read on a voltmeter in a voltage follower circuit. The polarographic test utilizing the instrument is made more specific for $$-\overset{O}{\underset{}{\overset{\|}{C}}}-$$

compounds, such as aldehydes, by reacting the test sample in aqueous medium with a hydrazine acid addition salt at a pH of about 3 to 6.5 to form the hydrazone in aqueous medium which is detectable with great sensitivity and specificity. The working electrode may be underlying or may be suspended, but in any event, is best replaced or renewed or cleaned between determinations.

In an embodiment that is especially useful for carrying out polarographic analysis in non-aqueous, but conducting, medium there is employed a third electrode, a counter electrode, and the special circuit includes an operational amplifier electrically connected to each of the counter electrode and the reference electrode in such a way that the reference electrode is non-working and relatively non-variant, the current flow in the cell being between the working electrode and the counter electrode as monitored and controlled in response to the reference electrode.

28 Claims, 11 Drawing Figures

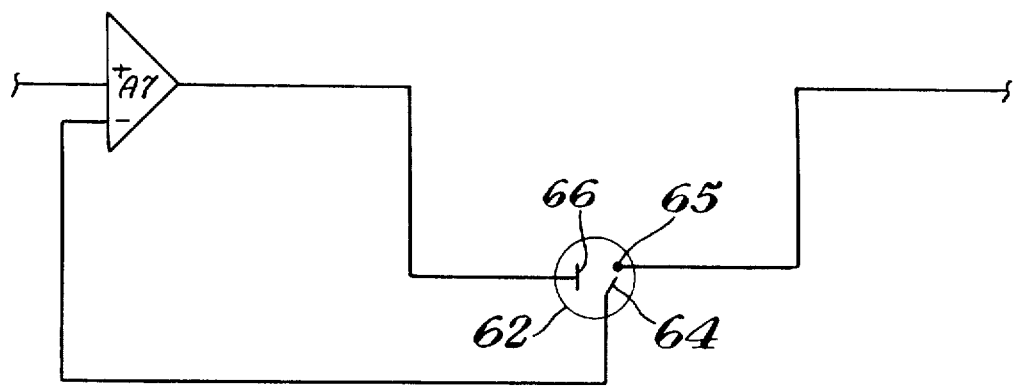
Fig. 8
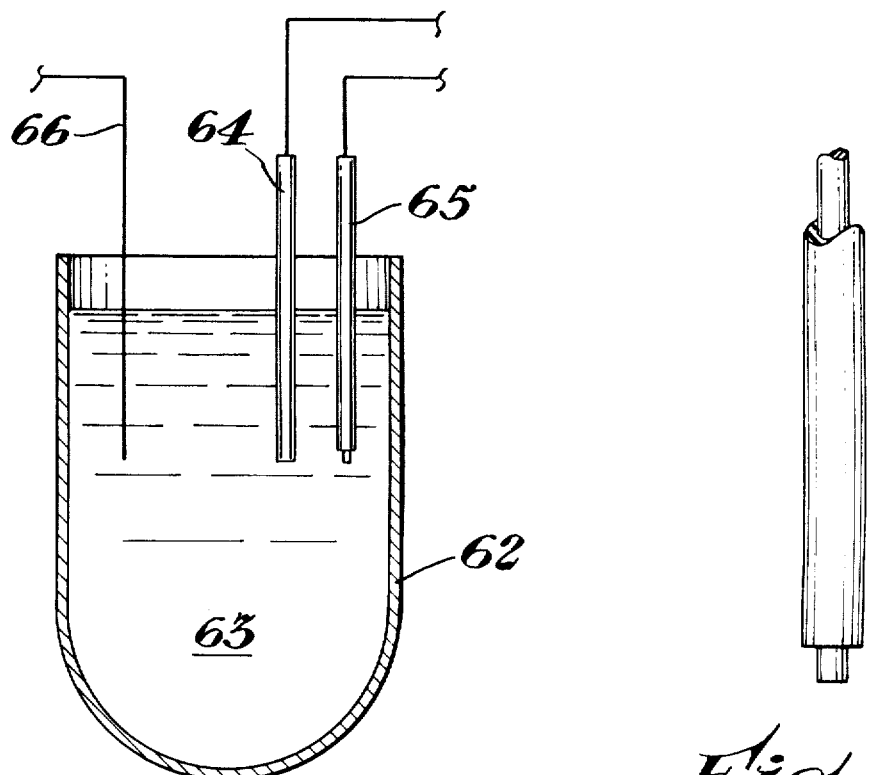
Fig. 9
Fig. 10

3,922,205

PORTABLE POLAROGRAPHIC ANALYZER AND QUICK POLAROGRAPHIC DETERMINATIONS

CROSS REFERENCE TO RELATED APPLICATION

This application is a continuation-in-part of copending application Ser. No. 389,821 filed Aug. 20, 1973 which is in turn a continuation-in-part of application Ser. No. 250,167 filed May 4, 1972 both now abandoned.

BACKGROUND OF THE INVENTION

1. Field of the Invention

The invention relates to a special purpose polarographic instrument and method for the quantitative determination of polarographically reactive, i.e., reducible or oxidizable, species and more particularly relates to an instrument and method for the rapid, simple, repetitive, quantitative determination of such ion species using relatively inexpensive, yet rugged and reliable components.

2. Description of the Prior Art

During the development of classical polarography, a difficulty was encountered with reaction products, resulting from electrical current flow, coating at least one of the electrode surfaces and interfering with accuracy and reproducibility. Largely to solve this problem, the concept of the dropping mercury electrode was developed so that a clean mercury electrode surface was constantly renewed. The laboratory instrument in general use produces a strip chart record of pulsed current flow plotted against, typically, a time linear scanning potential. Such an instrument is flexible in showing the concurrent presence of a plurality of polarographically reactive species which react, i.e., reduce or oxidize, at differing applied potentials, and the applied potentials may be readily varied over a considerable range. The laboratory instrument suffers from the disadvantage of producing, at the electrode, a non-linear, pulsating wave form requiring extensive electronic and mechanical filtering to get a usable signal.

The laboratory instruments described are relatively expensive and slow in operation and are not well suited for rapid, simple, low-cost, repetitive, determinations of a single or several, reducible or oxidizable species free from interference from other substances reducing or oxidizing too close to the same applied potential.

SUMMARY OF THE INVENTION

A special purpose polarographic instrument for the rapid, repetitive, low-cost, quantitative determination of polarographically reactive, i.e., reducible or oxidizable, species in solution is provided upon combining a relatively small sample cell, suitable counter electrode, and/or suitable reference electrode equipped with (1) means for impressing a time linear scanning potential across the cell electrodes throughout a range of potential sufficient to reduce or oxidize the species to be quantitatively determined whereby a continuous unpulsed current flows between the working electrode and the reference electrode, or between the working electrode, and, the counter electrode if used, in proportion to the number of ions or molecules polarographically reacted, i.e., reduced or oxidized; (2) means for proportionally converting the current flow to a potential, and (3) voltmeter means for measuring said potential.

While each of the foregoing components are respectively generally old in the art, at least in a general way, the present invention is notable because of the marked advantages which accrue from this particular combination of features, particularly wherein the sample size, dictated by the small cell, and the electrodes employed, together with compatible circuits and electronic components therein provide for an instrument with only one operating switch or button in addition to an off-on switch which the unskilled cannot misuse. Further, instead of using the measuring circuit to drive a strip chart recorder which will exhibit a polarographic reaction curve requiring some interpretation to evaluate numerically, the present instrument provides for a single meter reading, preferably a digital readout, proportional to concentration of the reactive species in the sample cell and requiring no interpretation as only the maximum voltage is held.

FURTHER DESCRIPTION OF THE INVENTION

For the purposes of the description and the appended claims:

1. Polarographically reactive species means ions or molecules reducible on accepting electrons, or oxidizable on yielding up electrons in solution, by stable potentials producible within a polarographic cell, but without electrolyzing the solvent medium, such as water.

2. Interfering polarographically reactive, i.e., reducible or oxidazable, substance means any ion or molecule, besides the species to be measured, that is present in the sample solution and undergoes polarographic reaction by acceptance or yielding up of electrons by transfer at the surface of the working electrode and at a potential in the range at which a species to be determined also undergoes reduction or oxidation, the range being that swept by the instrument during time linear scanning and interfering substance being unresolvable because of the electrode reaction therewith taking place at a peak potential within less than about 60 millivolts of that of the potential at which the species to be determined also undergoes polarographic reaction. With 60 to 100 millivolts separation the resolution is generally adequate, while with 100 millivolts or greater separation between peak voltages resolution is assuredly adequate. With 200 millivolts and greater separation resolution is complete.

3. A generally U-shaped tube is intended to refer to a tube portion of most any configuration connected to the lower end of a sample cell and extending downwardly and then bending upwardly so as to be capable of holding mercury up to the joinder of the tube with the lower end of the cell.

4. A fixed area working electrode is either a quiescent mercury electrode or a conductive solid electrode made of a solid not rapidly destructively reactive with the sample solution solvent medium and of unchanging surface area in contrast to a dropping mercury electrode.

5. A quiescent mercury electrode means any of: (a) an underlying electrode provided by placing mercury in a U-tube connected to the lower end of the sample cell; (b) a graphite rod with the lower end polished and electroplated with mercury ions to provide a mercury film thereon; (c) a platinum wire embedded longitudinally in a glass rod with about a millimeter of wire protruding from the lower end and carrying a single droplet of mercury surrounding the exposed wire portion; and (d)

a hollow glass tube with a capillary tip, the tube being filled with mercury and equipped with means, when desired, to force a fresh mercury droplet out through the tip to replace a contaminated droplet, as after each polarographic determination.

6. A conductive solid electrode for use as a working electrode means any conductive solid that substantially does not react with the solvent medium except to establish a potential relative thereto and is capable of accommodating polarographic reduction or oxidation of the species to be determined. Examples of suitable metals or other solid materials of construction for such conductive solid working electrode are carbon, gold, silver, nickel, iron or most any solid metal that is practical to use in the solvent employed and substantially does not undergo chemical reaction with the solvent medium under analytical test conditions.

7. A conductive solid electrode is not rapidly destructively reactive with the solvent medium of the sample solution if it substantially does not react with the solvent medium more than is necessary to establish a potential relative thereto.

8. A sample electrolyte solution is a solution containing species to be polarographically reacted, the solution being sufficiently electrolytically conductive to permit carrying out polarographic analysis. The electrolytic conductivity may arise because of the nature of the medium or the sample dissolved therein or the combination thereof.

9. A non-conducting cell body is an electrolytic cell body that is formed of glass or ceramic material that is inherently non-conducting or one that is formed of a conductive material and electrically insulated from each of supporting structure and also from each of the electrodes used.

10. A relatively non-variant potential is that provided by a suitable reference electrode relative to the sample electrolyte solution and whose normal fixed potential is not varied by passage of sufficient current to complete the polarographic reaction of the species under determination.

A suitable solvent medium for use in the present method is a conductive liquid that is capable of transporting charged species while at the same time being preselected coordinately together with the working electrode and the reference electrode, as well as any counter electrode, so that there is not a rapidly destructive reaction between the solvent and any of the electrodes, or for that matter, the cell itself, nor any electrode reaction per se with the solvent itself at the polarographic potentials employed in analytical determinations using the solvent medium.

The solvent must dissolve the species under test. Mass transport must be fast enough to give a measurable current flow.

Water is clearly the solvent medium of choice in most work. Other suitable solvent media will more likely be used when the sample species occur therein or are relatively insoluble or unstable in water. Examples of suitably polar liquids include: methanol, ethanol, pyridine, dimethylsulfoxide, acetonitrile, dimethylformamide, methylene chloride, tetrahydrofuran, 1,4-dioxane, chloroform, and a mixture of miscible liquids such as methanol and methylene chloride.

The reference electrode must be one, such as the standard calomel electrode, capable of establishing a constant potential with the solution, or against the fixed area working electrode, and suitability for use in any given sample is largely determined by the propensity of the electrode to maintain such constant potential and not be affected by the current flowing in the system. The current flows through the reference electrode in a two electrode arrangement, but passes mainly through the counter electrode in a three electrode arrangement. In the latter arrangement, the counter electrode and reference electrode are each so connected to the same operational amplifier, and the reference electrode provided with high enough resistance in series therewith that relatively little current passes through the reference electrode, thus minimizing any adverse effect of current flow on the ability of the reference electrode to maintain a constant potential.

The counter electrode is another fixed area electrode and must readily accommodate current flow in support of the electron transfer process during the polarographic reaction.

In the two electrode arrangement the reference electrode provides the function of the counter electrode, i.e., of carrying the necessary current for polarographic reaction, and must do so for valid analyses, without losing its ability to establish and maintain a constant potential relative to the working electrode or the solution. The reference electrode most readily serves both functions in highly conductive solutions, while the counter electrode is most needed in less conductive solutions.

Examples of suitable reference electrodes include most any calomel electrode, including saturated calomel and standard calomel electrodes, a silver-silver chloride electrode, or a glass electrode.

In organic solvent medium the most convenient fixed area electrode to use is simply a platinum wire. In aqueous solutions any of the reference electrodes may be used together with a salt bridge such as a salt bridge of KCl, LiCl, tetraalkylammonium chloride or tetraalkylammonium bromide. The LiCl or tetraalkylammonium chloride or bromide salt bridges will be preferred if a salt bridge is to be used where an organic solvent is employed.

The instrument and method of the invention is usable for the quantitative determination of most any polarographically reactive species present in sample solution substantially free from interfering polarographically reactive substances as the instrument is not capable of discriminating between substances that undergo polarographic reaction at too closely spaced peaks at a potential within the range scanned. A reactive species undergoing electrode reaction within the range scanned and exhibiting a peak potential at least about 60 millivolts from any other reactive species is resolvable therefrom. A 100 millivolt separation allows a sharper resolution and with 200 millivolts separation resolution is unmistakably clear. The present instrument is readily constructed and used as a portable instrument because of its simplicity and its lack of a strip chart recorder, though it can be connected to such a recorder, if desired.

FIG. 1 of the drawings is a view in elevation partly diagrammatic and partly schematic showing the instrument of the invention.

FIG. 3 is a schematic view showing a cell and electrode configuration for another embodiment of the present polarographic instrument.

FIGS. 4, 5 and 6 are each a framentary view of the lower end portion of a mercury cathode usable in the configuration of FIG. 3.

FIG. 8 is a fragmentary portion of a circuit diagram showing a portion of a circuit that may be used as a replacement for the corresponding portion of that shown in FIG. 7. The so-modified circuit is suitable for use with a three electrode arrangement.

FIG. 9 is a schematic view similar to FIG. 3 showing a cell and electrode configuration for another embodiment of the present instrument in which a three electrode arrangement is used.

FIG. 10 is a fragmentary view of the sensing end of a simple fixed area electrode consisting of an insulated metal wire having some of the insulation stripped off an end portion.

Figure 1:
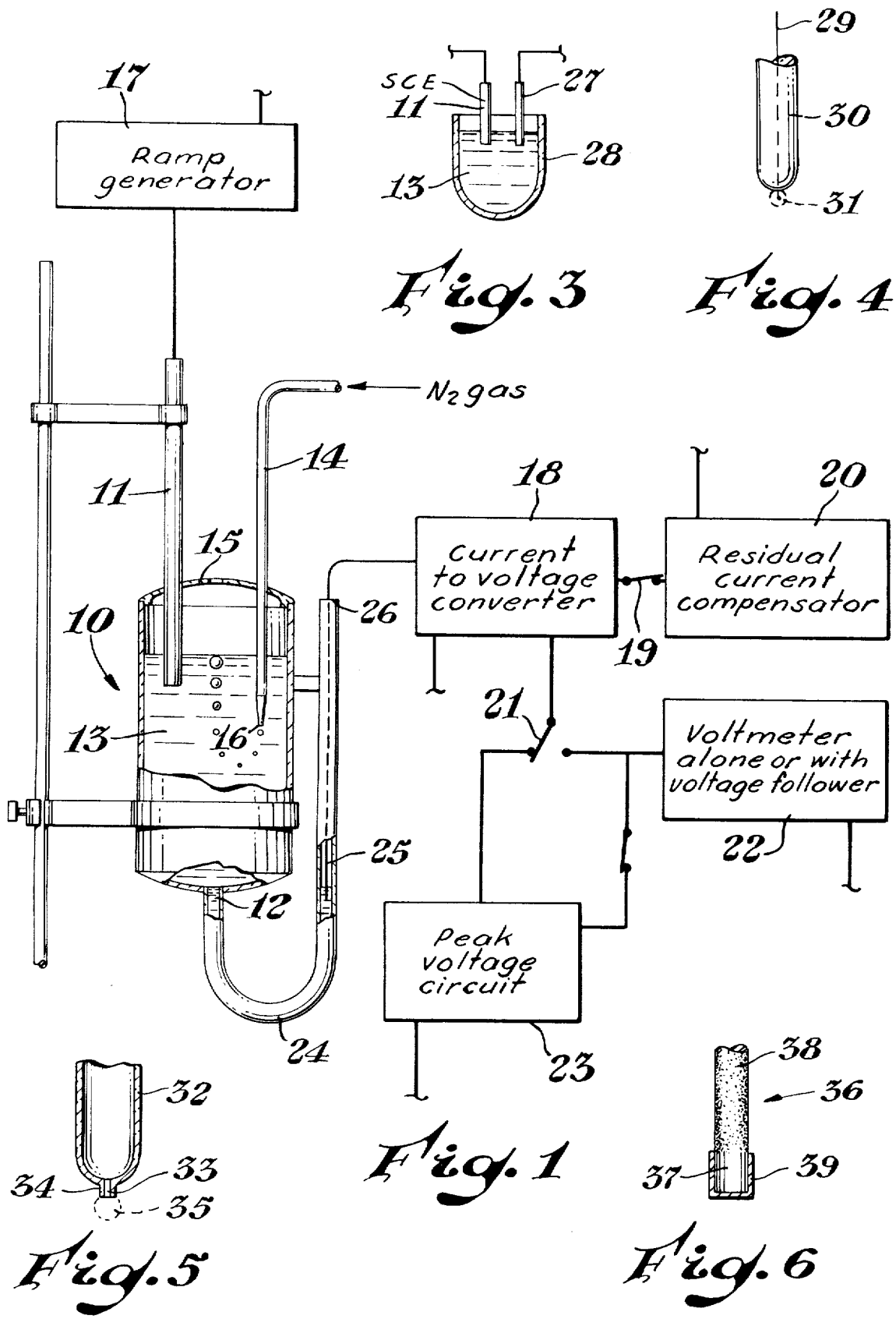

Referring now to FIG. 1, wherein a complete embodiment of the present instrument is shown in part diagrammatically and in part schematically, the apparatus is seen to consist of a sample cell indicated generally by the numeral 10, an electrode 11 in the form of a saturated calomel reference electrode or other suitable reference electrode, an underlying quiescent mercury electrode 12 serving as fixed area working electrode, and a circuit for impressing a potential across the electrodes and measuring the resultant current flow as the consequence of reaction of reactive species in the solution 13 in the cell 10. Preferably, there is also provided means for sweeping oxygen from the solution 13 and maintaining an inert gas cover above the solution during a polarographic determination of reducible species. Such means may take any convenient form, but is shown in FIG. 1 as a small tube 14 inserted through a cover 15 for the cell 10 and conveying nitrogen or other inert gas from a supply not shown, to a point well down in the solution 13. If the tube 14 makes a friction fit through an opening in the cover 15, the tube is conveniently slipped part way out of the cover 15 to the extent that the delivery tip 16 is above the surface of the solution 13 and is maintained in that position to provide an inert gas cover during the polarographic determination when the sample should not be disturbed by bubbling inert gas therethrough. The scanning potential that causes reaction of a polarographically reactive species is produced by any suitable ramp generator 17 that provides a time linear potential scan across the desired range sufficient to react the species to be determined. Generally such range extends over about 0.4 to 0.7 volt and falls within 0 to 3 volts absolute potential.

In the configuration shown in FIG. 1 the ramp generator is connected to the reference electrode and provides for reduction of reactive species at the fixed area working electrode. Wherein oxidizable species are to be determined the ramp generator 17 must provide for oxidation of the species at the working electrode.

The resultant current flow when a reactive species is present is converted to a potential or voltage in a converter circuit 18. Preferably, and optionally, there is connected to the converted circuit 18, by means of a switch 19, a residual current compensator circuit 20 for balancing residual current flow transmitted by the electrolyte 13 so that the potential observed as a final result is corrected for such residual current, through such residual current may be separately measured and substracted as a base line reading, if desired.

The potential generated in the converter circuit 18 may be measured directly by appropriately operating switch 21 to connect up directly measuring means 22 which may be simply a voltmeter, but is preferably a voltage follower circuit 22 which includes a voltmeter.

For simple operation as by a relatively unskilled operator, it is preferred to connect the converter circuit 18 to the measuring means 22 via a peak voltage circuit 23. Such circuit 23 includes a capacitor and diode combination such that the peak potential is stored for a time and thus provides for a steady reading in the voltmeter of circuit 22 for a sufficient time for the operator to take a reading, the exact length of time being determined by the nature of the components employed in the peak voltage capture section of the circuit.

In the event two species sufficiently separated for resolution are determined in a single scan the operator must maintain observation of the voltmeter readout during the scan and note the reading during any noticeable pause in increasing readout, such as a static reading lasting about 2 seconds or more. This initial reading when taken with the final reading at the conclusion of the scan permits quantitative determination of each component, the second component being determined from the difference between the two readings.

The walls of the cell 10 and of the U-tube 24 which holds the quiescent mercury cathode 12 must be formed of an insulator, usually glass, or if formed of a conductive material such as metal or graphite, must be lined with an insulative layer such as polyethylene or otherwise insulated from the surroundings. Electrical cantact between the mercury electrode 12 and the current to voltage converter circuit 18 is provided by inserting a platinum wire 25 or other wire not reactive with mercury into the electrode mercury 12, and extending such wire 25 or an electrical lead connected thereto, out the open end 26 of the U-tube 24 and extending to the converter circuit 18.

In another embodiment of the present instrument, there is used the cell configuration shown schematically in FIG. 3. In this cell configuration there is no underlying working mercury electrode. Instead the reference electrode, such as saturated calomel electrode 11 and the mercury electrode 27 are positioned side by side extending into sample solution 13 in a cell 28 having no connecting U-tube portion.

The mercury electrode 27 may take the form of the electrodes illustrated in the fragmentary views of FIGS. 4-6. The electrode of FIG. 4 consists of a platinum lead 29 extending longitudinally through a piece of glass rod 30 with about a millimeter of the lead 29 protruding out of the lower end of the rod. The protruding portion of the platinum wire is electroplated with mercury ions, as well understood in the art. On dipping the electrode into mercury a drop of mercury 31 clings about the protruding wire. The so-prepared electrode is then carefully mounted in the cell and the drop of mercury 31 serves as the true fixed area working electrode during a polarographic determination test. The electrode is cleaned and prepared anew for each determination to provide a clean mercury electrode free from reaction products produced during the polarographic determination.

The mercury electrode 27 of FIG. 5 consists of a hollow non-conductive tube 32, generally of glass, with a capillary size opening 33 formed through a drip-tipped shaped lower end portion 34. The interior of the tube 32 is filled with mercury and any suitable mechanical means, not shown, is employed to squeeze a fresh drop of mercury 35 of reproducible area out onto the drip-tip 34 when desired. Such well-known mechanical means may take the form of a screw down cap on the tube 32 carrying a plunger which displaces the mercury incrementally, or, a mechanical pump may be employed, including compact portable means for producing a continuous series of reproducible mercury droplets during determination runs. The electrode of FIG. 5 has the convenience of providing a clean mercury surface without dismounting the electrode from the cell.

The electrode of FIG. 6 consists of a solid bar or rod 36 of graphite with the lower end portion 37 smoothly polished throughout about a 0.5 to 0.75 inch length commencing at the lower tip, the remainder 38 of the rod being unpolished. On electroplating the polished portion 37 with mercury ions, a film 39 of mercury is retained thereon and serves as the true working electrode on placing the electrode into the sample cell as in FIG. 3. Preferably, between determinations, the electrode 36 is wiped clean with a paper tissue, or otherwise cleaned as by dipping into diluted nitric acid and dried before refilming with clean mercury, although in some cases a simple rinse with distilled water may suffice.

Throughout all of the determinations, using the present instrument and method, wherein mercury is used, a high quality clean mercury is employed, preferably, triple distilled mercury.

Solid fixed area working electrodes or counter electrodes may take the form of the electrode shown in the fragmentary view of FIG. 10. The electrode there shown is simply a piece of insulated platinum, nickel or chrome wire with the insulation stripped off a bit of the end, e.g., off about ½ to ¾ inch of the wire.

Most any competently designed and constructed electronic circuits may be used which fulfill the essential voltage and current measurements when combined in a manner similar to the preferred circuits indicated schematically in FIG. 1. Those skilled in the instrumental and electronic arts can readily design such circuits, particularly with reference to available literature such as "Generalized Instrumentation For Research and Teaching", Charles Morrison, Jr., Washington State University, Pullman, Wash., 1964, which shows, inter alia, the basic polarographic circuit, explains the IR drop of the cell, per se, shows examples of integrators and other functional electronic building blocks, such as a linear residual current compensator.

Other helpful publications include (1) "Operational Amplifiers — Design and Applications," by Tobey, Graeme and Houelsman, McGraw-Hill, New York, 1971; (2) "Basic Operational Amplifier Circuits for Analytical Chemical Instrumentation" 2nd. Ed., L.P. Morgenthaler, McKee-Pederson Instruments, Danville, Calif., 1968; and (3) "MP-System 1000, Operation and Applications," 4th Ed., McKee-Pedersen Instruments, Danville, Calif., 1971.

Figure 2:
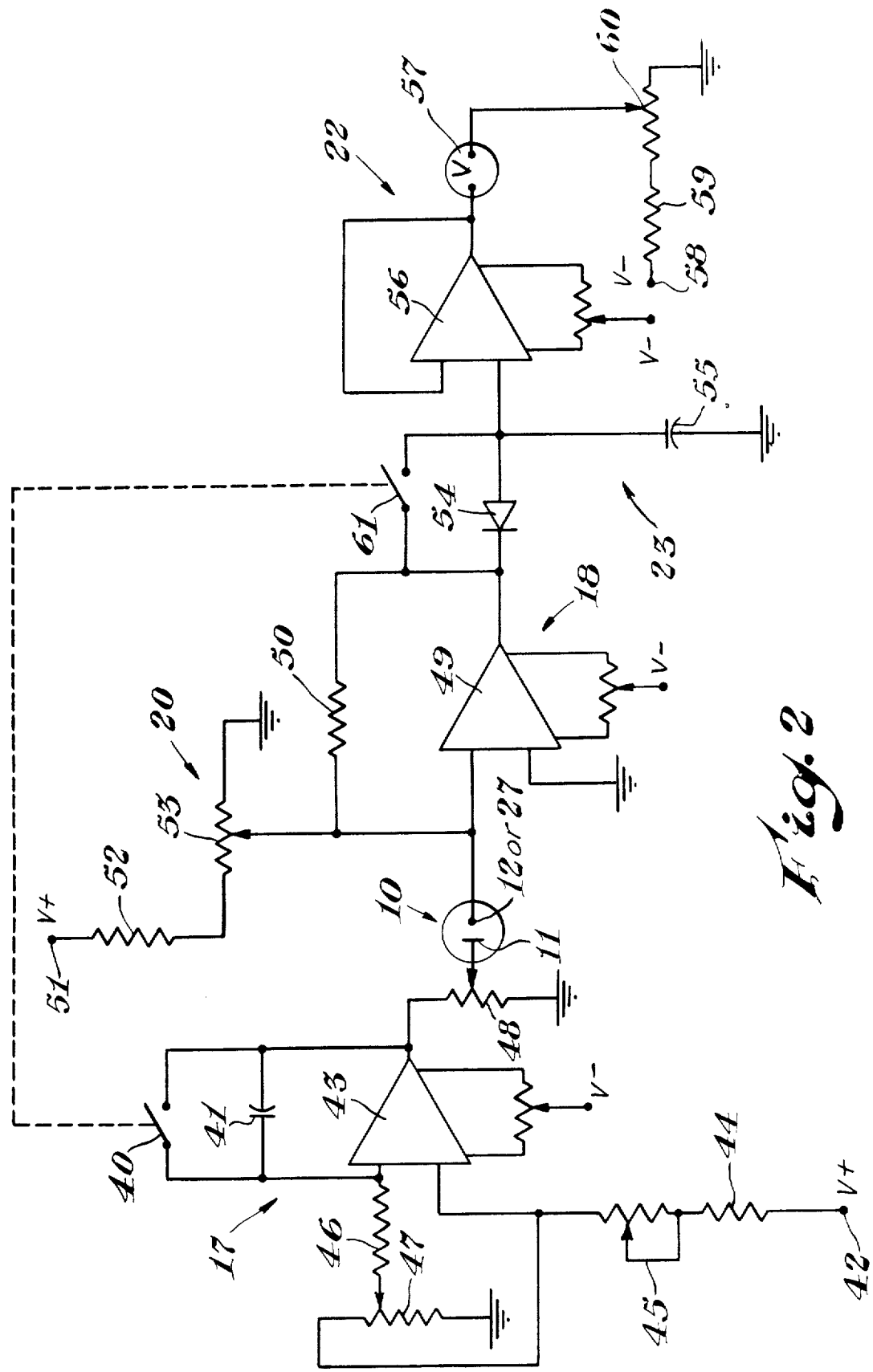
FIG. 2 is a circuit diagram showing a suitable circuit for use in the present invention, though modifications of such circuit may be designed and used, if desired, as well understood in the art.

The operations of the instrument of FIG. 1 will be better understood by those skilled in the art on becoming familiar with the following description of suitable electronic circuits, reference being had to FIG. 2. The circuits of FIG. 2 can readily be modified or replaced by those skilled in the art but are presented as tested and highly suitable circuits that perform the functions desired according to the present invntion. In general, the circuits of FIG. 2 make use, where applicable, of the modern operational amplifier, such as Analog Devices AD 503 J amplifier.

As seen in FIG. 2, while switch 40 is open so as not to short out capacitor 41 in the ramp generator circuit 17, and while power is being supplied at power input 42, the ramp generator circuit supplies a time linear scanning potential to the saturated calomel reference electrode 11 and causes a current flow due both to a reaction of polarographically reactive species in the electrolyte in the cell 10 and to residual current conduction by the electrolyte medium.

The ramp generator circuit utilizes an operational amplifier 43 with negative feedback as shown. Both of the positive and negative inputs are adjustable by changing total resistance values to control the range, and the absolute levels of potential values, as well as the rate of scan. The positive input is controlled by fixed resistor 44 of about 5,600 ohms and a variable resistance 45 of about 5,000 ohms, maximum value. The negative input is controlled by a fixed resistor 46 of about 10 million ohms and a variable resistance 47 of about 5,000 ohms. The capacitor 41 has a rating of about 0.47 microfarad. Further adjustment in operation is had with a variable resistor 48 between the output of the operational amplifier 43 and the saturated calomel electrode or other reference electrode. The variable resistor 48 preferably has a a maximum resistance value of about 10,000 ohms.

The current flow through the cell is directed to the current to voltage converter circuit 18 which consists primarily of an operational amplifier 49 with negative feedback through a fixed resistor 50 of about 1 million ohms resistance.

Preferably, there is utilized in conjunction with the converter circuit 18, an adjustable residual current compensator circuit consisting of a power source connected to ground through a fixed resistor 52 of about 560,000 ohms value and a variable resistance 53 of about 5,000 ohms maximum value, with a connection to the negative feedback to the operational amplifier 49 being picked off at the variable resistance 53.

If desired, the output of the operational amplifier 49 beyond the negative feedback may be led directly to a voltmeter or the the voltage follower circuit 22, but preferably, a peak voltage circuit 23 is utilized for the convenience of the instrument operator. The circuit 23 consists of a diode 54 through which current is led substantially irreversibly to a capacitor 55 of about 1 microfarad rating. In capacitor 55, current is stored as a potential that is read in the voltage follower circuit 22. Since capacitor 55 is charged irreversibly, it will exhibit maximum voltage reading to the voltage follower circuit until normal leakage sets in.

The voltage follower circuit consists of an operational amplifier 56 with direct negative feedback, the output being led to voltmeter 57. Adjustments to readings of the voltmeter are made as well understood in the art utilizing a balancing circuit consisting of a power source 58, a fixed resistor 59 of about 560,000 ohms value and a variable resistance 60 of about 5,000 ohms value leading to ground, the connection to the voltmeter 57 being picked off at the variable resistance 60.

At the conclusion of a polarographic determination run or test, the instrument is reset by closing switch 40 to discharge the capacitor 41 in the ramp generator circuit 17 discharging the built up or "ramped-up" potential and providing for the potential to be built up again from the lower pre-selected value during the next run. Wherein the peak voltage circuit 23 is used, it is also necessary to close switch 61 to discharge capacitor 55 before the next run. Generally provision is made to open or close switches 40 and 61 simultaneously.

In carrying out the polarographic method of this invention, a sample solution is provided or obtained which contains a polarographically reactive species to be determined as part of a series of samples. The instrument, being a special purpose instrument, will be set up and adjusted for the rapid, repetitive, low-cost, accurate determination of a given polarographically reactive species in a series of samples. While the instrument is adjustable for the potential values and ranges for determination of various substances, it is designed primarily for advantageously running numerous samples of the same type between adjustments, rather than a variable mix requiring frequent adjustments.

The sample to be tested must be substantially free of other materials which reduce within the scanning potential range for the species being determined since the present instrument shows peak voltage readings rather than the classical half wave potentials. A sample containing other substances which merely interfere per se with the reduction of the species may often be analyzed, however, by the process of making known additions as well understood to analysts.

The sample, which may be an aqueous or non-aqueous solution, is admixed with an electrolyte solution, as well understood in the polarographic arts, to provide basic background conduction, unless the sample normally and inevitably contains sufficient electrolyte to provide conductivity. The resulting sample electrolyte solution that is placed in the sample cell for test is of a concentration that must be determined by test as being in a range in which the instrument yields a straight line response between quantity of reactive species in the cell 10 and potential read on the voltmeter 57. If the sample concentration is out of the linear response range, it must be concentrated or diluted as may be required.

The temperature of the sample may be at most any convenient level in the range of about 40 to 110 degrees Fahrenheit. However, the preparation of the working curve must be carried out at substantially the same temperature to achieve reasonable accuracy.

The present instrument and method is well suited for the polarographic determination of water soluble aldehydes and ketones, i.e., compounds containing the carbonyl functions, viz.,

These compounds are reacted with a hydrazine acid addition salt to form the hydrazone salt. The polarographic test is very sensitive for such hydrazone and as a consequence, the test becomes quite specific, in most cases, for the carbonyl type compound, and especially at high dilution.

The method is particularly suitable for the determination of aldehydes such as formaldehyde. Formaldehyde is very accurately determinable at a concentration of about 10 to about 50 micrograms in 10 milliliters of aqueous electrolyte solution.

In a typical test for formaldehyde concentration, 4 milliliters of sample solution estimated to contain about 10 to 50 micrograms of formaldehyde is admixed in a sample cell of somewhat more than 10 milliliters capacity, with about 5 milliliters of buffer solution for maintaining a pH value in the range of about 3 to 6.5, and 1 milliliter of an aqueous 2 percent solution of hydrazine sulfate. These components are mixed and deoxygenated by bubbling substantially oxygen-free nitrogen therethrough for about 5 minutes. Then the nitrogen delivery tube is raised to provide an inert gas cover above the mixed sample electrolyte solution and the determination is made by turning on the power source to the ramp generator circuit as well as the other power sources in the instrument. The ramp generator is designed to scan the pre-selected potential range of about −0.6 volt to about −1.1 to −1.2 volts in approximately one minute during which the polarographic determination is made and a final peak voltage indicated on the voltmeter 57. After reading of the voltmeter the instrument is reset and the sample cell is cleaned out and the mercury electrode, in whatever form, is provided with a fresh, clean mercury surface. The instrument is then ready for the next determination.

Working curves are prepared for formaldehyde determinations utilizing commercially available 37 percent by weight formaldehyde solution as a known. Conveniently, about 0.3 gram of solution is accurately weighed and diluted to one liter. This standard solution is stable for about one month. Daily working standards containing about 10 micrograms formaldehyde per milliliter are prepared upon making a 1:10 dilution of the above described standard solution.

The formaldehyde determination described is particularly applicable to the determination of aldehydes generated in auto engine operation and collected by drawing engine exhaust through a cold trap in which water and other products of combustion are collected. In engines of current design, the condensate is generally brought into the working range by dilution 1:10 with water and utilization of a sample of about one milliliter to which buffer and hydrazine is added.

Figure 7:
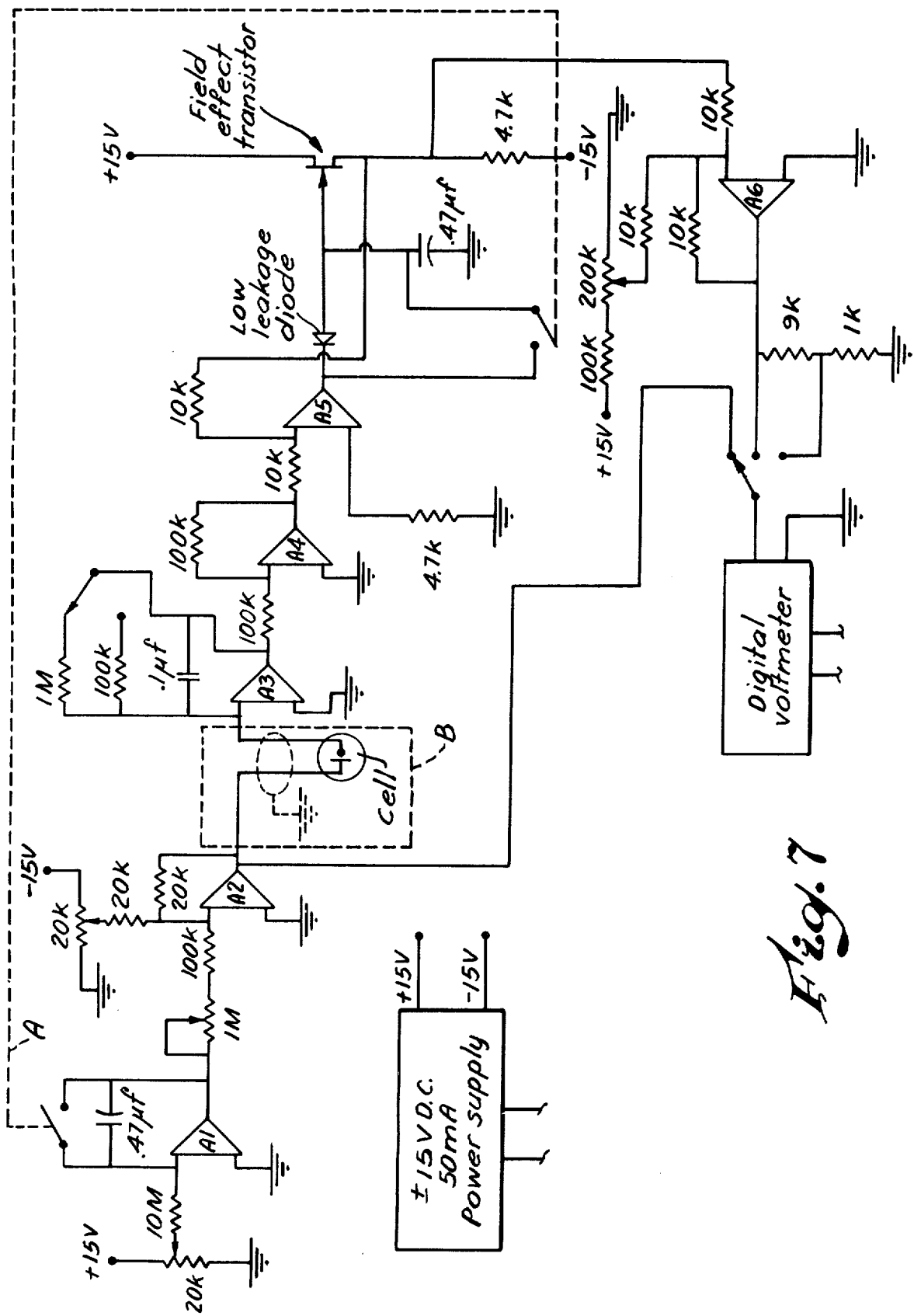
FIG. 7 is a circuit diagram showing a circuit generally similar in function to that shown in FIG. 2, but somewhat more sophisticated in design.
Figure 11:
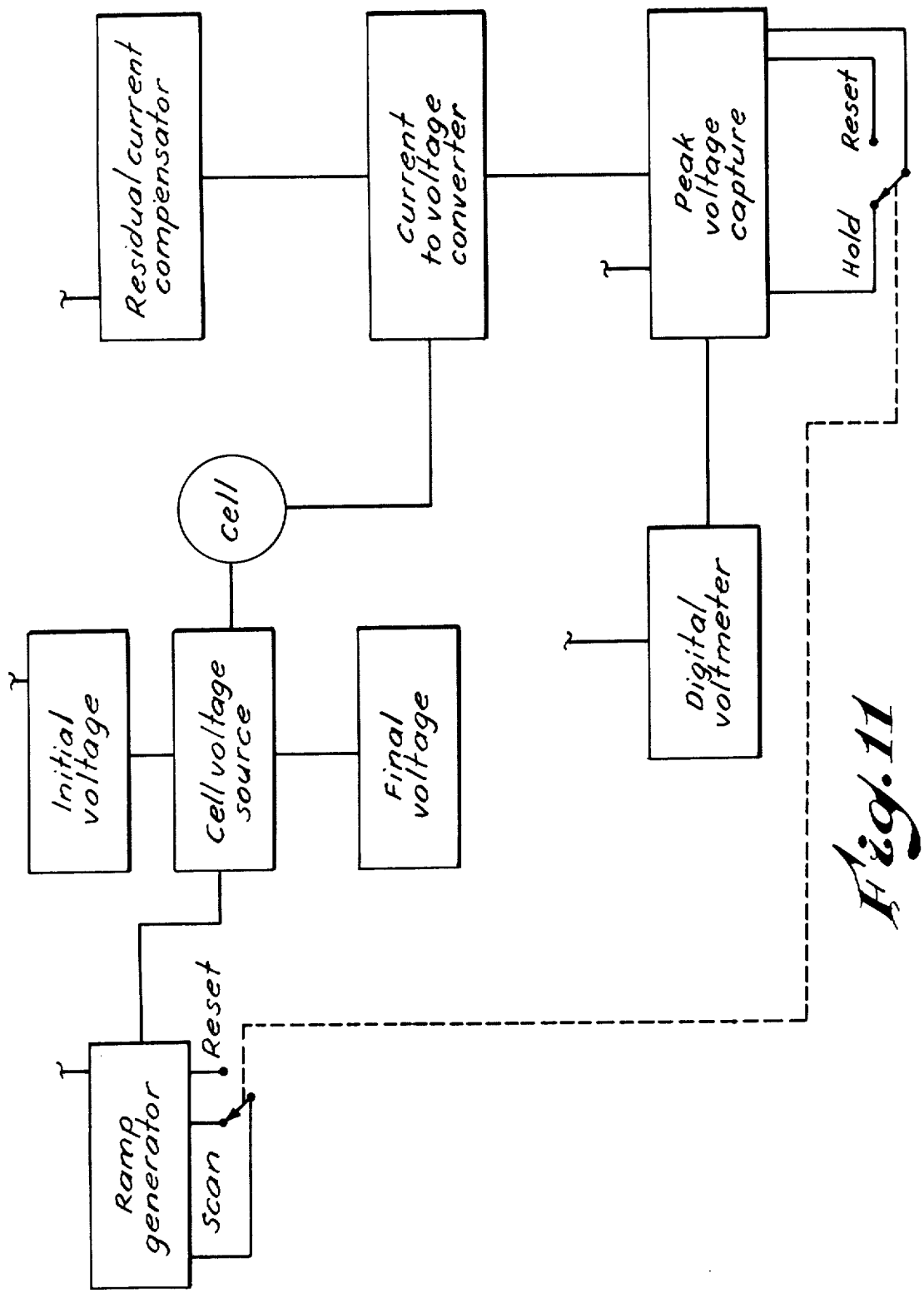
FIG. 11 is a schematic block diagram of the circuit shown in FIG. 7.

A more advanced and sophisticated circuit for use in the present apparatus is shown in block diagram form in FIG. 11 and as a circuit diagram in FIG. 7. The symbols used in FIG. 7 are those conventionally employed in circuit diagrams. A1 through A6 are operational amplifiers. A1, A2, A4, A5 and A6 are model AD 301 amplifiers supplied by Analog Devices while A3 is a model AD 503 amplifier from the same supplier. In the circuit diagram it is to be understood that the appropriate terminals of the ± 15 volts D.C., 50 milliampere power supply are connected to the respective power connection points in the circuit marked +15 v. or −15 v. Also the digital voltmeter is understood to have an appropriate power supply. The dotted line "A" connecting two of the switches in the circuit indicates that it is desirable but not essential to control the switches together simultaneously to discharge the capacitor in the ramp generator section and to discharge the capacitor in the peak voltage circuit section.

In carrying out polarographic determinations in most aqueous solutions using the method of the invention there is preferably employed a three electrode arrangement such as that indicated schematically in FIG. 9 in which there is shown a sample cell body 62 charged with a sample solution 63 and having the sensing rods with inserted therein of a reference electrode 64, a working electrode 65 and a counter electrode 66. The electrodes are to be understood to be connected into the instrument circuit as in the fragmentary circuit diagram shown in FIG. 8. The fragmentary portion there shown replaces the portion of FIG. 7 shown in the dotted rectangle "B." In the cell shown schematically there is represented the reference electrode 64, the working electrode 65 and the counter electrode 66. The triangle labeled A7 is an operational amplifier model AD 502 from the supplier referred to above.

The non-aqueous solution 63 must be an electrolytically conducting solution because of its inherent polarity, or because of ionic species dissolved therein, or a combination of both factors. However, the electrolytic conductibility of non-aqueous solutions is generally limited at best. As a consequence, it is generally difficult to impress sufficient potential between a reference electrode and a working electrode to achieve the necessary current flow for polarographic reaction without at the same time imparing the ability of the reference electrode to maintain a truly constant potential towards the solution. Therefore, a counter electrode is used and by means of a circuit section including, here, an operational amplifier, a high resistance is coupled in series with the reference electrode 64 whereby little current flows therethrough. At the same time the operational amplifier directs sufficient current flow from the counter electrode 66 to the working electrode 65 to achieve the polarographic reaction potential scan desired as measured by the reference electrode and the working electrode couple. The three electrode arrangement also works quite satisfactorily in aqueous solutions but is generally not needed as the aqueous solutions are sufficiently conducting that the reference electrode can also serve the function of counter electrode.

The counter electrode as shown schematically in FIG. 9 may be simply a piece of bare metal wire or most any material that is conducting and may be, e.g., an underlying mercury pool electrically connected as is the mercury pool in FIG. 1. The working electrode should have a very limited surface area such as a small hanging mercury drop, or a small mercury plated carbon rod, or a small uncoated carbon rod, or a piece of insulated metal wire, such as platinum or gold wire, with typically about one-eighth to one-fourth inch of wire exposed such as that shown in FIG. 10. The limitations in surface area limits the current flow so that the reference electrode is not affected adversely in its ability to maintain a constant potential. Generally a working electrode of mercury or carbon is used for determining polarographically reducible species while carbon, platinum and gold are used for determination of polarographically oxidizable species.

Those familiar with the polarographic art will readily convert classical determinations to the present rapid method upon observing that one microampere response in the classical instrument corresponds largely to one volt response in the present instrument.

An important basis for the present invention is the discovery that the peak voltages obtained with the present instrument utilizing a fixed area working electrode are accurately proportional to the quantity of reducible species in the polarographic cell throughout reasonable working ranges of sample concentration.

Among the advantages of the instrument of the present invention are its easy portability, simplicity of construction, ruggedness of components ordinarily utilized, as well as the speed and ease with which polarographic determinations are carried out using such instrument in contrast to the classical laboratory polarograph.

We claim:

1. A special purpose polarographic instrument for the rapid repetitive quantitative determination of a polarographically reactive species in an electrolyte solution in the substantial absence of interfering substances, which consists essentially of, in combination:

a hollow non-conducting cell body in the form of a receptacle adapted to receive about 5 to 25 milliliters of sample electrolyte solution;

a fixed area working electrode positioned so as to physically and electrically contact said electrolyte solution placed in said cell;

a reference electrode adapted to be positioned extending into said cell to a sufficient depth to have the sensing end immersed in said electrolyte solution when the cell is in use;

means for supporting the said reference electrode with the sensing end thereof with the cell body;

means for electrically connecting each of the reference electrode and the working electrode, respectively, to special circuitry to make a completed operative circuit;

said special circuitry embodying (1) means for automatically impressing for a preselected time interval during each said determination, a continuous, linear scanning potential across the electrodes in the cell throughout a preselected voltage range sufficient to cause to polarographically quantitatively react species to be quantitatively determined whereby a continuous unpulsed current flows between the electrodes during said time interval, the current flow being proportional to the number of ions or molecules polarographically reacted; (2) means for automatically proportionally converting the current flow to a potential; (3) a circuit portion having peak value means including a capacitor and a diode in combination for capturing and retaining the maximum potential arising from conversion of the current flow; (4) means including a voltmeter for automatically measuring said maximum potential; and (5) means for discharging the captured and retained maximum potential.

2. The instrument as in claim 1 which employs additionally a third electrode in the form of a counter electrode and the special circuitry embodies an operational amplifier, the reference electrode and the counter electrode each being electrically connected to said operational amplifier in such a manner that the reference electrode is a non-working electrode that is relatively non-variant in potential, the current flow in the cell when in use being primarily between the working electrode and the counter electrode, the current flow resulting from the potential established between the reference electrode and the working electrode.

3. The instrument as in claim 2 wherein the voltmeter is incorporated in a voltage follower circuit.

4. The instrument as in claim 2 wherein the voltmeter is provided with a digital readout.

5. The instrument as in claim 2 wherein the special circuitry embodies means for resetting the scanning potential means.

6. The instrument as in claim 2 wherein the special circuitry includes means for making a residual current correction in connection with the means for converting current flow to potential.

7. The instrument as in claim 2 wherein means is provided for sweeping oxygen from aqueous sample solution in the sample cell and maintaining an inert gas cover over said solution during quantitative determination of polarographically reactive species in said solution.

8. The instrument as in claim 1 wherein the voltmeter is incorporated in a voltage follower circuit.

9. The instrument as in claim 1 wherein the voltmeter is provided with a digital readout.

10. The instrument as in claim 1 wherein the special circuitry embodies single switch means for simultaneously resetting the scanning potential means and initiating said impressing of scanning potential, converting current flow to a potential and measuring such potential.

11. The instrument as in claim 1 wherein the special circuitry includes means for making a residual current correction in connection with the means for converting current flow to potential.

12. The instrument as in claim 1 wherein means is provided for sweeping oxygen from sample electrolyte solution in the sample cell and maintaining an inert gas cover over said solution during quantitative determination of polarographically reactive species in said solution.

13. The instrument as in claim 1 wherein the instrument is adapted to quantitatively determine reducible species.

14. The instrument as in claim 1 wherein the fixed area working electrode is a quiescent mercury pool.

15. The instrument as in claim 1 wherein the fixed area working electrode is a hanging drop of mercury.

16. The instrument as in claim 1 wherein the reference electrode is a calomel electrode.

17. The instrument as in claim 1 wherein the reference electrode is a silver-silver chloride electrode.

18. The polarographic method of quantitatively determining a polarographically reactive species on conducting sample solution in the substantial absence of interfering polarographically reactive substances which comprises:
placing in a non-conducting sample cell body from about 5 to about 25 milliliters of sample solution containing a quantity of polarographically reactive species less than an amount which exceed the linear response range of said instrument, the sample cell body having positioned therein a reference electrode and a fixed area working electrode each having the sensing end thereof immersed in said sample solution;
sweeping oxygen gas from the sample solution in the cell and providing an inert gas cover over said solution during analysis;
impressing a scanning potential between said electrodes which varies linearly with time throughout a range sufficient to cause polarographic reaction of said polarographically reactive species whereby a continuous unpulsed current flows between the electrodes;
proportionally converting the resultant current flow into a potential the maximum of which is stored by means of a circuit portion including a diode and a capacitor;
and measuring said stored potential by voltmeter means.

19. The method as in claim 18 wherein the polarographically reactive species are reducible species.

20. The method as in claim 19 wherein the reducible species is an organic compound containing the

functional group.

21. The method as in claim 20 wherein the aqueous sample solution is buffered to about pH 4 and sufficient soluble acid salt of hydrazine is added to convert substantially all the reducible species to the hydrazone and the potential range scanned is about −0.6 to about −1.2 volts.

22. The method as in claim 20 wherein the concentration of reducible species placed in the sample cell does not exceed about 10 parts per million.

23. The method as in claim 19 wherein oxygen is swept from the sample solution by inert gas sparging before commencing analysis and an inert gas cover is maintained over the sample solution during analysis.

24. The method as in claim 18 wherein the said capacitor means is discharged after measuring the stored potential and another quantity of another sample solution containing polarographically reactive species is placed in said sample cell and the concentration of the species polarographically quantitatively determined as in claim 18.

25. The method as in claim 18 wherein the built up potential is measured by voltmeter means with digital readout.

26. The method of rapid quantitative polarographic determination of polarographically reactive species in sample electrolyte solution containing such species in the substantial absence of interfering species which comprises:
placing about 5 to about 25 milliliters of sample electrolyte solution in a hollow non-conducting cell body having a fixed area working electrode, a fixed area counter electrode and a reference electrode each positioned therein so as to have the sensing end thereof immersed in the sample solution:
impressing a continuous linear scanning potential across each of (1) the counter electrode and the working electrode, and (2) the reference electrode and the working electrode, the reference electrode being provided with a high impedance whereby the resulting current flow is substantially between the counter electrode and the working electrode and the scan continuing until the potential as measured between the reference electrode and the working electrode is at least sufficient to cause said species to be determined to polarographically react, whereby a continuous unpulsed current flows between the electrodes;
proportionally converting the flow to a potential the maximum of which is stored by means of a circuit portion including a diode and a capacitor;
and measuring the stored potential with a voltmeter.

27. The method as in claim 26 in which the maximum potential obtained, as a result of converting current flow to a potential, is retained until read.

28. The method as in claim 26 in which the sample solution is a non-aqueous solution.

* * * * *